United States Patent [19]

Deboffles

[11] 4,030,593
[45] June 21, 1977

[54] LOADING APPARATUS

[76] Inventor: Regis Pierre Deboffles, Abbecourt, 02300 Chauny, France

[22] Filed: Mar. 16, 1976

[21] Appl. No.: 667,289

[52] U.S. Cl. .............................. 198/308; 198/311; 198/522; 198/861

[51] Int. Cl.² ........................................ B65G 47/16

[58] Field of Search ............ 198/64, 213, 233, 308, 198/320, 304, 309, 311, 522, 538, 861

[56] References Cited

UNITED STATES PATENTS

| | | | |
|---|---|---|---|
| 1,922,023 | 8/1933 | Baer | 198/213 |
| 2,390,286 | 12/1945 | Adams | 198/213 X |
| 2,492,341 | 12/1949 | Walters | 198/213 X |
| 2,601,916 | 7/1952 | Bobrowski | 198/233 |
| 2,630,905 | 3/1953 | Howe | 198/64 X |
| 2,744,620 | 5/1956 | Davis et al. | 198/213 |
| 3,141,545 | 7/1964 | Holland, Jr. | 198/213 |
| 3,178,009 | 4/1965 | Gooding | 198/64 |
| 3,556,289 | 1/1971 | Erickson | 198/233 |
| 3,729,087 | 4/1973 | Bruns | 198/64 X |
| 3,825,138 | 7/1974 | Pool | 198/64 X |

FOREIGN PATENTS OR APPLICATIONS

| | | | |
|---|---|---|---|
| 205,592 | 5/1955 | Australia | 198/233 |
| 529,273 | 10/1953 | Canada | 198/213 |
| 1,004,210 | 9/1965 | United Kingdom | 198/213 |

Primary Examiner—Evon C. Blunk
Assistant Examiner—Richard K. Thomson
Attorney, Agent, or Firm—William D. Stokes

[57] ABSTRACT

The present invention relates to an apparatus for loading bulk matter, such as fertilizer, said apparatus being characterized in that it comprises on the one hand a container mounted on an axle provided with wheels at its ends and on the other hand a cylindrical sleeve inclined with respect to the vertical whose lower end plungers into said container, said sleeve containing an Archimedean screw of diameter slightly smaller than the inner diameter of said sleeve and being able to open longitudinally to give access to said screw, while said latter is removably mounted inside said sleeve.

8 Claims, 8 Drawing Figures

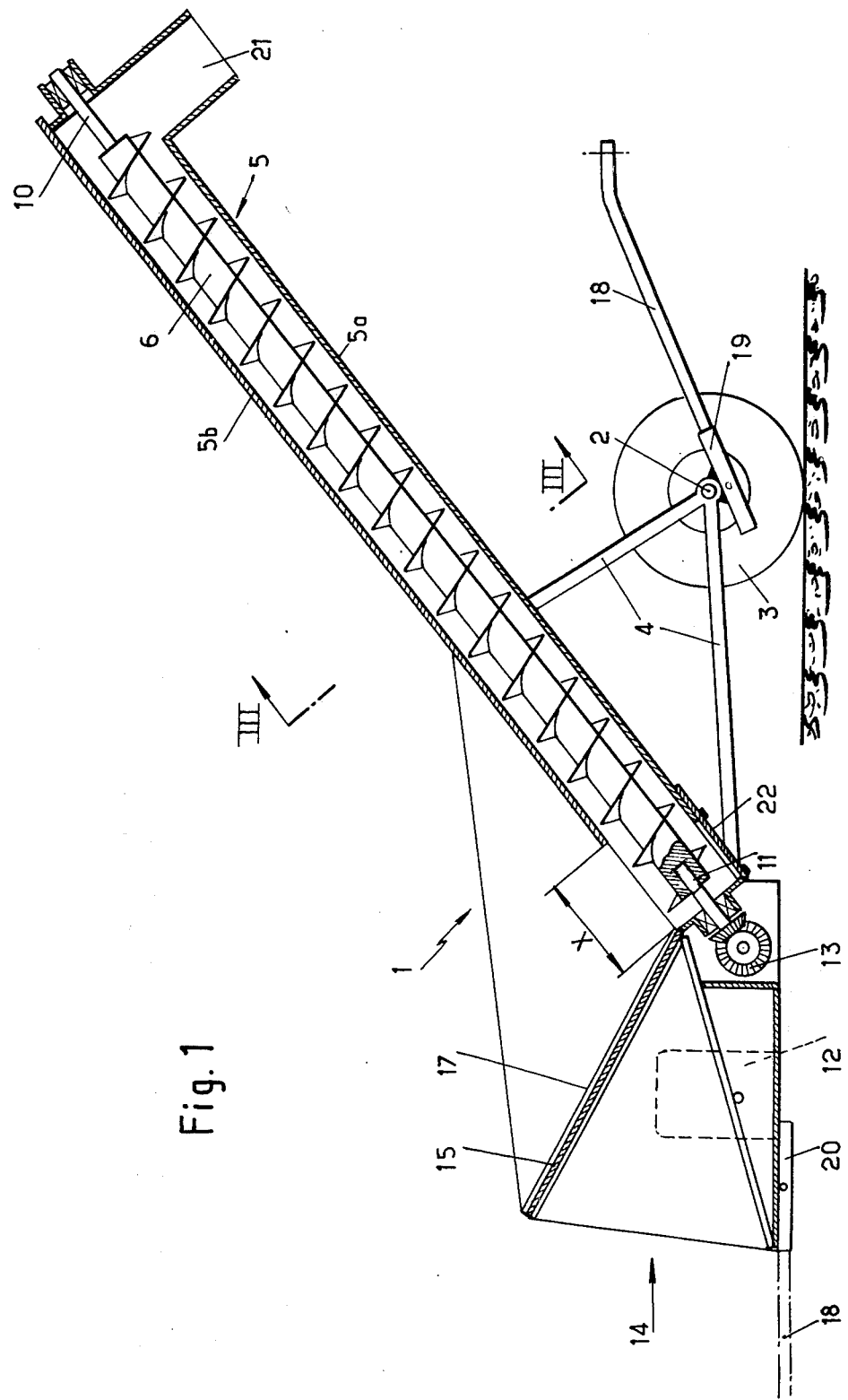

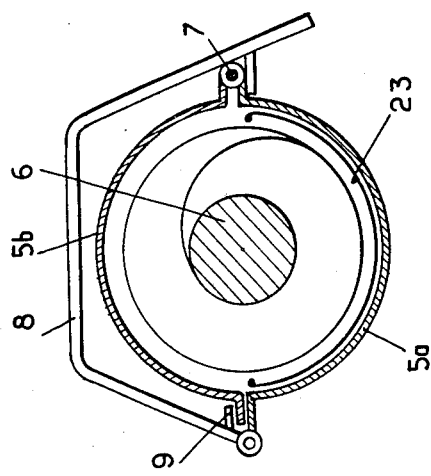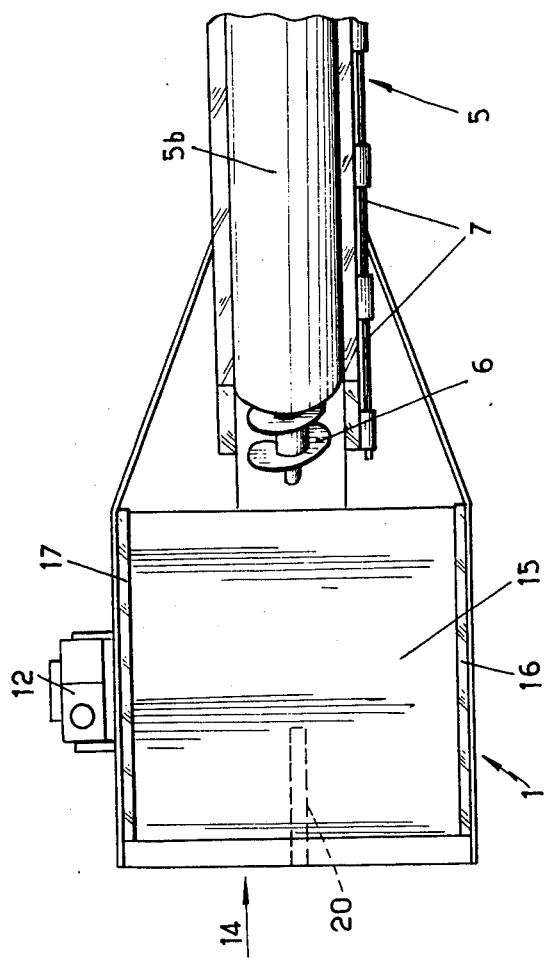

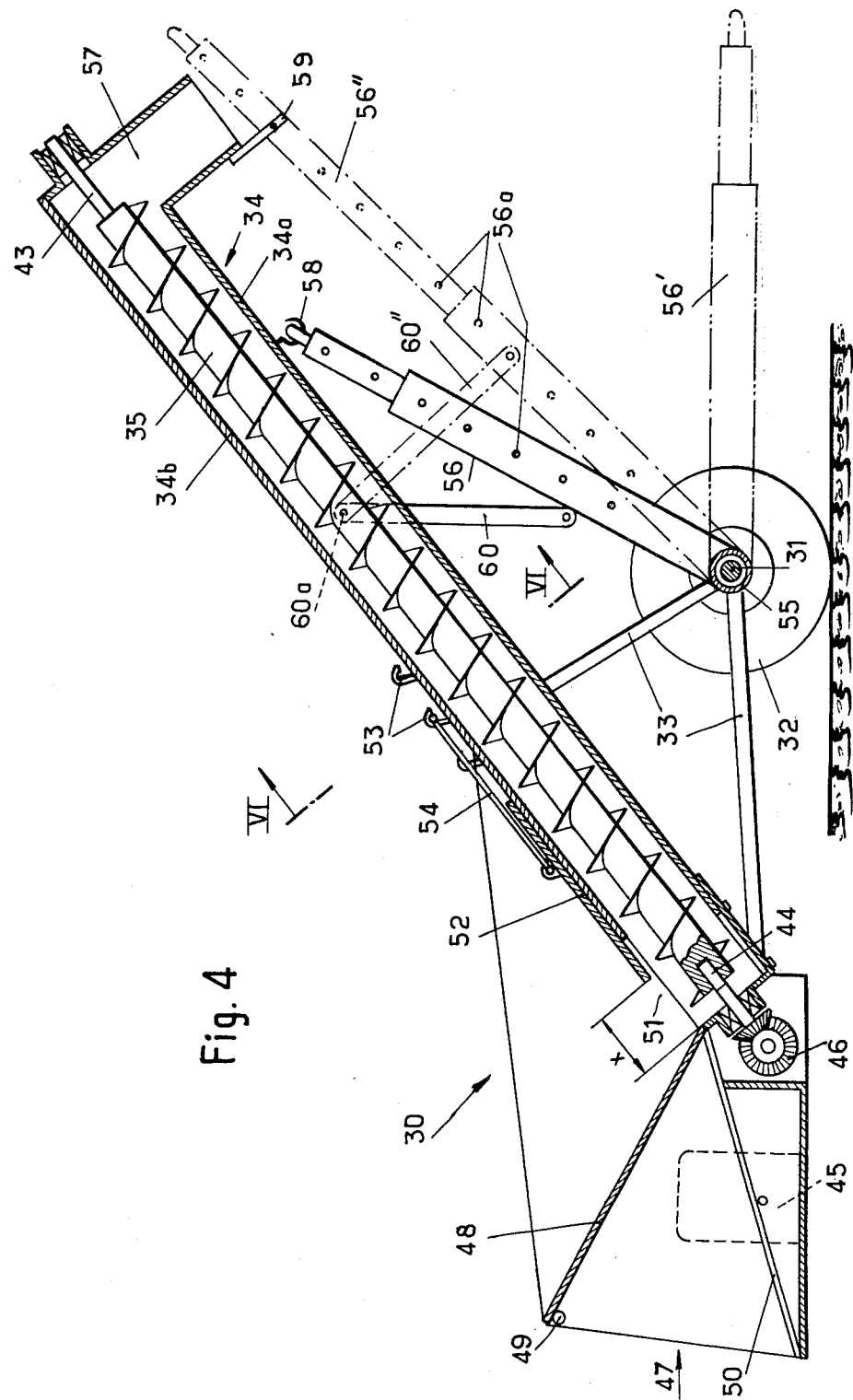

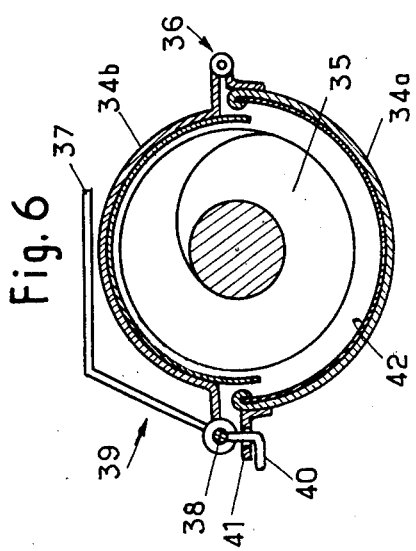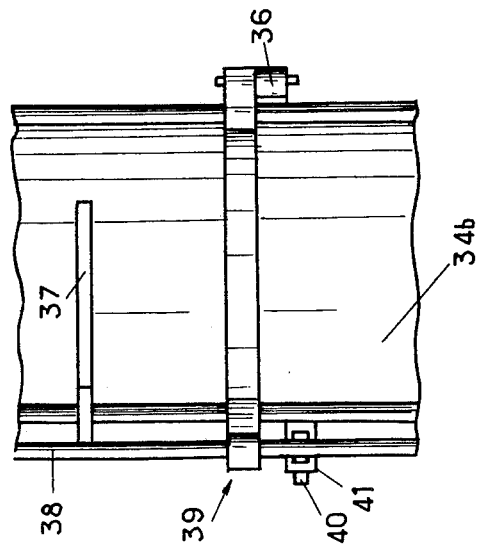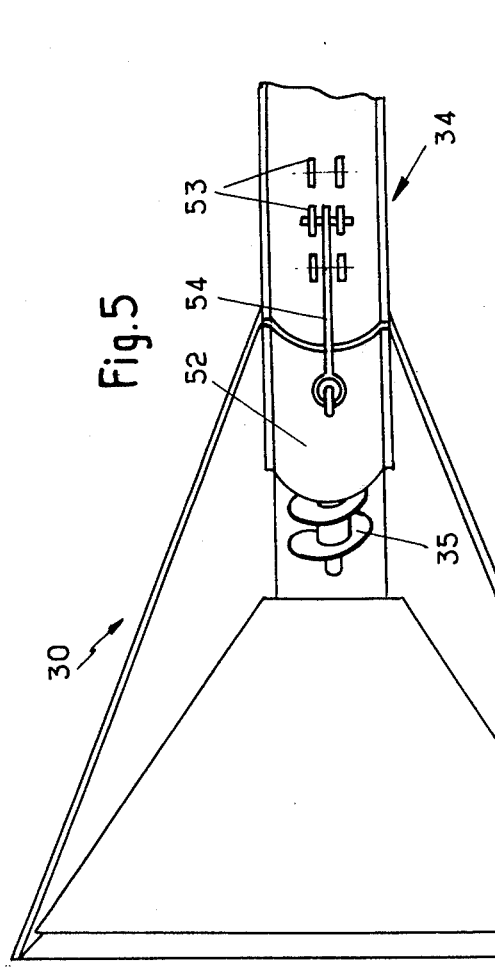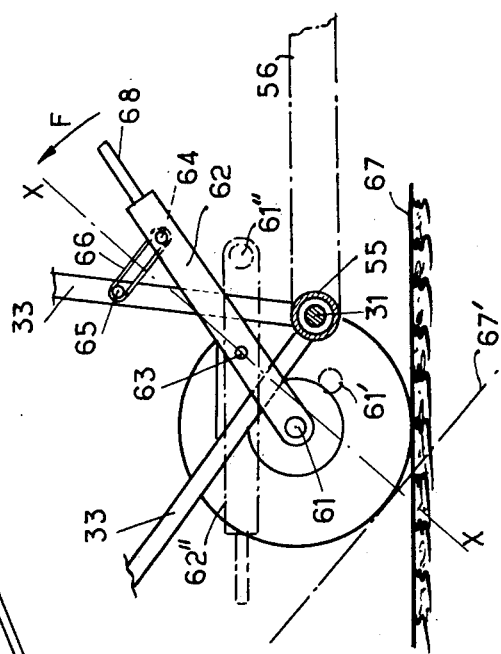

LOADING APPARATUS

The present invention relates to an apparatus for loading bulk matter, such as fertilizer.

It is known that, to scatter bulk fertilizer in the form of powder and/or granules, in a field, it is necessary for example to load a truck with said fertilizer at the farm, then, once the truck has arrived at the field, to transfer the fertilizer therefrom into a spreader.

It is an object of the present invention to provide an apparatus for loading bulk matter that may serve, inter alia, both for loading the truck either from a hopper or from a heap, and for loading the spreader from the truck.

To this end, according to the invention, the bulk matter loading apparatus is noteworthy in that it comprises, on the one hand, a container provided with two side wheels and, on the other hand, a cylindrical sleeve disposed in the median plane of the wheels and inclined with respect to the vertical, the lower end of said sleeve plunging into said container and said whole sleeve containing an Archimedean screw whose diameter is slightly smaller than the inner diameter of said sleeve which may open longitudinally to give access to said screw, while said screw is removably mounted inside said sleeve.

The sleeve is preferably formed of two half-cylinders removably assembled along an axial diametrical plane, while, with respect to said sleeve, the upper part of the Archimedian screw is mounted on a sliding bearing and its lower part on a drive shaft of polygonal section or with grooves, slidably engaged in a corresponding axial recess in said screw.

In order that the apparatus may be easily used in the fields, it advantageously comprises its own motor for driving the Archimedean screw.

The two half-cylinders of the sleeve are advantageously articulated along one of their common generatrices, said sleeve being so disposed that the lower half-cylinder is fast with said container while the upper half-cylinder forms a cover for the first. The upper half-cylinder may be fixed to the lower half-cylinder by means of an elastic locking system with single control.

In this way, after said sleeve has been opened by the upper half-cylinder (not fast with the container) being rotated about the generatrix of articulation, it is possible to dismantle said screw. This makes it possible to clean the inside of the sleeve from time to time to avoid clogging by the bulk matter.

The articulation of the upper half-cylinder with respect to the lower half-cylinder may permit the longitudinal slide of the first with respect to the second. In this way, it is possible to vary the length of the portion of the Archimedean screw uncovered in the container and consequently to vary the flow of the bulk matter (for example as a function of its viscosity).

However, there may be no longitudinal slide of the articulation of the two-half-cylinders, instead of the upper half-cylinder being able to slide with respect to the lower half-cylinder. In this case, a sliding trap door or hatch that may be adjustably fixed with respect to the upper half-cylinder, enables the length of the portion of the Archimedean screw uncovered in the container to be varied.

In order to permit loading from a heap, the container is shaped as a shovel on the side opposite said screw and the relative arrangement of the axle and the container is such that the bottom of said shovel normally rests on the ground.

Furthermore, to allow loading from a hopper or pipe, the container comprises a removable wall enabling the shovel to be obturated and converted into a hopper, at least on the side facing the screw.

The apparatus according to the invention advantageously comprises a removable shaft that may be fixed either on the side where the shovel opens out, or on the side facing the screw. When this shaft is fixed on the shovel side, the apparatus may be coupled to a tractor and be displaced. When it is fixed on the screw side, it may serve for maneuvering the apparatus, e.g. for making the shovel penetrate into a heap of bulk matter.

As a variant, the loading apparatus may comprise a telescopic shaft directed on the side opposite the container, articulated about an axis parallel to that of the wheels and adjacent thereto, fastening means being provided under said sleeve to maintain the shaft in at least one position for which it may serve to pull said apparatus, the sleeve then being brought substantially horizontal by rotation about said wheels.

The apparatus may also comprise under the sleeve other means for fastening said shaft, when the apparatus is in loading position, i.e. when the sleeve is upright.

Moreover, particularly for its transport on the highway, the apparatus may be provided with a suspension. This preferably allows several heights for said container in loading position, for adjustement purposes. To this end, this suspension may be such that each wheel is mounted at the lower end of a lever which is articulated on the chassis about an intermediate axis and of which the upper end is connected to said chassis by means of a removable elastic ring.

In order to avoid wear and tear of the lower half-cylinder by the matter to be loaded, the inner wall thereof is preferably coated with an abrasion-resistant coating.

The invention will be more readily understood from the following description of preferred embodiments of the invention, with reference to the accompanying drawings, in which:

FIG. 1 is a schematic view in longitudinal section of the loading apparatus according to the invention.

FIG. 2 is a partial plan view of the apparatus of FIG. 1.

FIG. 3 is a section along line III—III of FIG. 1.

FIG. 4 is a schematic longitudinal section through a variant embodiment of the loading apparatus according to the invention.

FIG. 5 is a partial plan view of the apparatus of FIG. 4.

FIG. 6 is a section through line VI—VI of FIG. 4.

FIG. 7 is a partial plan view of the sleeve of the apparatus of FIG. 4.

FIG. 8 illustrates a system of suspension for the apparatus of FIG. 4.

Referring now to the drawings, FIGS. 1 to 3 show a loading apparatus which comprises a container 1 mounted on an axle 2 provided with wheels 3 at its ends. The container 1 is connected to the axle 2 by means of a chassis 4.

At one of its ends, the container 1 is fast with a cylindrical sleeve 5, inclined with respect to the vertical and whose lower end plunges into said container. This sleeve 5 contains an Archimedean screw 6 whose diameter is slightly smaller than the inner diameter of said sleeve. Said sleeve is formed of two half-cylinders 5a and 5b articulated along a rod 7, parallel to the axis of the sleeve 5 and the screw 6. The lower half-cylinder 5a is fast with the container 1, whilst the half-cylinder 5b serves as a cover for the first. The half-cylinders 5a and 5b may be fixed to each other by means of an elastic locking system comprising a hoop 8 articulated at one of its ends on an edge of the half-cylinder 5a and hooking under the rod 7. The hoop 8 comprises a stop 9 that may press an edge of the upper half-cylinder 5b against the corresponding edge of the lower half-cylinder 5a. The upper half-cylinder 5b is preferably provided to slide along the rod 7 (when the hoop 8 is unlocked) so as to be able to vary the length X of the screw 6 exposed or uncovered in the container 1.

With respect to the sleeve 5, the upper part of the Archimedean screw 6 is mounted on a sliding bearing 10 and its lower part on a square-sectioned drive shaft 11 slidably engaged in a corresponding axial recess in said screw.

It is thus understood that, by suitably choosing the length of the bearing 10 and after opening of the cover 5b, it is possible to dismantle the screw 6 by sliding it axially upwardly at first to release it from the shaft 11, then downwardly to release it from bearing 10. The shaft 11 is rotated by an internal combustion engine 12 mounted laterally along the container 1, by means of a conical gear 13.

On the side opposite the sleeve 5 and the screw 6, the container 1 is shaped as a shovel 14 and the relative arrangement of the axle and the container is such that the bottom of this shovel 14 normally rests on the ground. A removable transverse wall 15 which is slidable like a trap door or hatch in lateral slides 16 and 17 borne by the inner walls of the container, enables the shovel 14 to be obturated and transformed into a hopper, on the side facing the screw 6.

A removable shaft 18 may be fitted either in a sleeve 19 fast with the axle 2 or in a sleeve 20 disposed under the shovel 14.

When the shaft 18 cooperates with sleeve 20, it is possible to free the shovel 14 from the ground (by rotation about axle 2) and to hook the apparatus behind a tractor for transport purposes.

When the shaft 18 is fitted into sleeve 19, it is possible to maneuver the apparatus of the invention (e.g. by hand), for example to make the shovel 14 penetrate into a heap of bulk matter (the wall 15 then being removed).

When the wall 15 is in place, it is possible to pour the matter to be loaded into that part of the container 1 between said wall 15 and the screw 6 (said part forming hopper). In this case, as in the preceding one (introduction of the shovel 14 into a heap), the bulk matter comes in contact with the screw portion 6 freed by the cover 5b and is lifted by said screw 6 to be dispersed through a spout 21 at the top of the sleeve 5.

An inspection trap door or hatch 22 may be provided in the lower part of the half-cylinder 5a. An abrasion-resistant coating 23 is provided inside this latter.

In the variant embodiment shown in FIGS. 4 to 8, the elements bearing references 30, 31, 32, 33, 34, 34a, 34b, 35, 43, 44, 45, 46, 47, and 48 correspond respectively to the elements of FIGS. 1 to 3 bearing references 1, 2, 3, 4, 5, 5a, 5b, 6, 10, 11, 12, 13, 14 and 15.

In this variant embodiment, the half-cylinders 34a and 34b are fixed to each other by means of a locking system comprising a lever 37 fast with a rod 38 parallel to the axis of the sleeve 34 and rotating about its axis owing to bearings 39 fixed on the longitudinal edge of the half-cylinder 34b opposite hinges 36. Stops 40 are fast with the rod 38 and may hook into clips 41 fast with the half-cylinder 34a. The longitudinal edges of the lower half-cylinder 34b are preferably rolled and imprison the edges of an abrasion-resistant coating 42. The diameter of the upper half-cylinder 34b is slightly smaller than that of the lower half-cylinder 34a so that its longitudinal edges can fit between the edges of said lower half-cylinder.

On the side opposite the sleeve 34 and screw 35, the container 30 is shaped as a shovel 47 and the relative arrangement of the axle 31 and the container 30 is such that the bottom of this shovel 47 normally rests on the ground. The removable transverse wall 48 bearing on the one hand on lateral lugs 49 fast with said container and on the other hand on the bottom 50 of the shovel, near the screw 35, enables the shovel 47 to be obturated and transformed into a hopper, on the side facing the screw 35.

As shown in FIG. 4, the upper half-cylinder 34b stops well before the lower end of the screw 35 so as to form an opening 51. In order to be able to vary the length X of the screw 35 uncovered in the container 30, the lower part of the upper half-cylinder 34b is covered in part by a cylindrical trap door or hatch 52, sliding parallel to the axis of the sleeve 34. The position of this cover 52, with respect to opening 51, may be fixed due to the cooperation of hooks 53, fixed to the upper half-cylinder 34b, with a hooked rod 54, articulated to said cover 52.

The axle 31 is surrounded by a cylinder 55 that may rotate freely thereabout. The end of a telescopic shaft 56 is welded to the cylinder 55.

When the wall 48 is in place and the matter to be loaded is poured into the hopper then formed by the container (position shown in FIG. 4), the apparatus lifts said matter and disperses it through a spout 57 at the top of the sleeve 34. In this case, the telescopic shaft is advantageously returned towards the sleeve 34 and its free end is advantageously fastened to a hook 58 fast with the lower half-cylinder 34a.

When the wall 48 is removed and the shovel 47 is made to penetrate into a heap of bulk matter, the shaft 56 is advantageously unfastened from the hook and occupies position 56'.

The shaft may then be used to make the shovel 47 penetrate into the heap of bulk matter, for example manually. Moreover, it will be noted that the shaft 56 is at this moment in a position to be coupled to a vehicle which, when in reverse, may advance the shovel 47 into said heap.

When the apparatus has to be moved from one point to another, the shaft 56 takes the position 56" where it is removeably fixed to a clip 59 fast with the spout 57. A stay 60, articulated at one of its ends at 60a to the sleeve 34, is possibly brought into position 60" and keyed by its other end on shaft 56. The loading apparatus may then be pivoted about its axle 31 and be hooked behind a vehicle, the sleeve 34 then being approximately horizontal.

The length of the shaft 56 may be fixed each time, with the aid of pins (not shown) passing through diametrical holes 56a in register with the telescopic elements of said shaft.

Instead of being mounted directly on the axle 31, the wheels 32 may be mounted to rotate about pin 61, connected to chassis 33 by means of a suspension system (cf. FIG. 8).

This suspension system comprises an oscillating lever 62 articulated on the chassis 33 about an intermediate axis 63 and on the lower end of which is fixed a pin 61. At its upper end, the lever 62 is provided with a lug 64 which is connected to a lug 65 of the chassis by means of an elastic ring 66.

FIG. 8 shows in solid lines the suspension device in traction position, that is to say when the shaft 56 occupies the position 56'' and the sleeve 34 is substantially horizontal.

When the apparatus according to the invention occupies the position shown in FIG. 4, everything takes place as if the ground 67 had come to 67'. Consequently, the lever 62 occupies a position which is only slightly inclined with respect to the vertical X—X.

Owing to a handle 68 extending the upper part of the lever 62, the lever 62 may be pulled in the direction of arrow F so that it takes a symmetrical position with respect to X—X, the pin 61 coming to 61'. The height of the apparatus may thus be varied.

If need be the ring 66 may be removed to bring lever 62 into position 62'', the pin 61 coming to 61''. In this way, the height of the apparatus may be reduced.

What I claim is:

1. Apparatus for loading bulk matter by transporting the same to a higher elevation with respect to the ground comprising:
   screw conveyor means for transporting bulk matter, said conveyor means having an aperture for entrance of bulk matter for conveyment thereof;
   a container having a bottom portion adapted for contacting the ground to place said container in a reset position, said container receiving said conveyor means in a transverse relationship with respect to the ground when said container is placed in said rest position and having said aperture located within said container above ground level, said container forming a shovel for movement of bulk matter therein from a ground level comprising:
   a. means defining a first opening in the side of said container for receiving bulk matter therethrough, said first opening disposed at ground level when said container is in said rest position; and
   b. a first guide wall bridging said first opening with said aperture, said first guide wall for guiding bulk matter to said aperture from said first opening as said container is moved relative to said bulk matter; and
   said container formed for providing a hopper comprising:
   a. means defining a second opening in said container at an elevation higher than said aperture when said container is in said rest position; and
   b. a second guide wall removably mounted within said container for obturating said first opening, said guide wall for aiding guiding of bulk matter to said aperture from said second opening.

2. Apparatus according to claim 1 wherein said first opening is defined by the top, bottom and sides of said container and wherein said second opening is defined by the topside of said container.

3. Apparatus according to claim 2 wherein said first guide wall includes a planar wall partition inclined from said bottom of said container to said aperture, and said second guide wall includes a planar wall partition inclined from said aperture to said top of said container.

4. Apparatus according to claim 1 and further including a pair of side wheels mounted to said container for permitting said container to be placed in said rest position, said side wheels disposed a distance from said bottom portion for pivoting said container from the ground about the axis of the wheels to permit transportation of said container.

5. Apparatus according to claim 4 wherein said screw conveyor means includes a cylindrical sleeve; and an Archimedian screw, said sleeve formed of two half-cylinders, on of said half-cylinders hinged to the other of said half-cylinders for opening of said sleeve for providing access to said screw.

6. Apparatus according to claim 5 wherein said one of said half-cylinders slidable longitudinally with respect to said other half-cylinder for varying the size of said aperture.

7. Apparatus according to claim 6 and further including locking means for frictionally securing said one half-cylinder to said other half-cylinder for preventing both longitudinal sliding and opening of said one half-cylinder.

8. Apparatus according to claim 4 and further including suspension means for varying the relative height of said container from the ground.

* * * * *